Figure 1:

Feb. 22, 1944.   L. POGLEIN   2,342,486
COMBINED GLASS DISH AND COVER PLATE
Filed April 9, 1941   2 Sheets-Sheet 1

INVENTOR.
Louis Poglein
William B. Jaspert
BY
Attorney.

Feb. 22, 1944. L. POGLEIN 2,342,486
COMBINED GLASS DISH AND COVER PLATE
Filed April 9, 1941 2 Sheets-Sheet 2

INVENTOR.
Louis Poglein
BY William B. Jaspert
Attorney.

Patented Feb. 22, 1944

2,342,486

UNITED STATES PATENT OFFICE 2,342,486

COMBINED GLASS DISH AND COVER PLATE

Louis Poglein, Jeannette, Pa., assignor to McKee Glass Company, Jeannette, Pa., a corporation of Pennsylvania Application April 9, 1941, Serial No. 387,579

1 Claim. (Cl. 65—59)

This invention relates to a combination glass dish and cover plate, and it is among the objects thereof to provide a combination of glass dishes and cover which, in addition to their utility as individual units for various uses, serve the purpose as combination ovenware and food storage containers.

Figure 2:
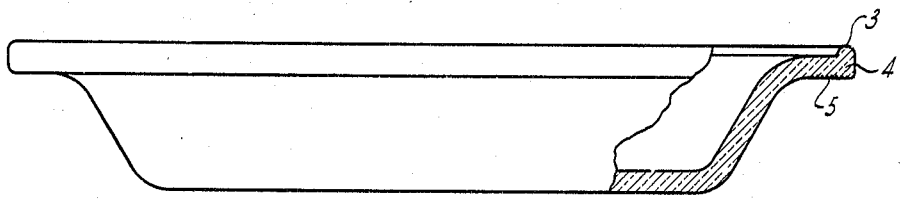
Figure 3:
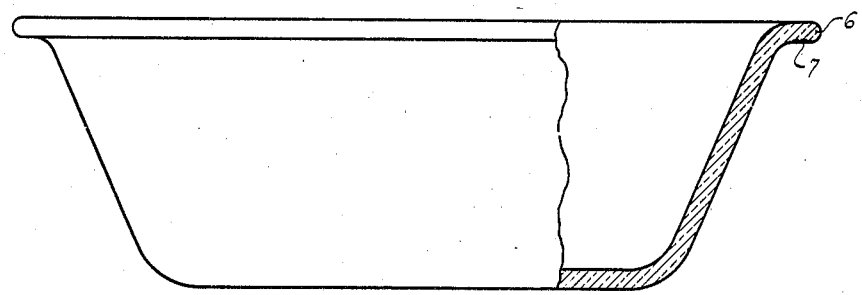
Figure 4:
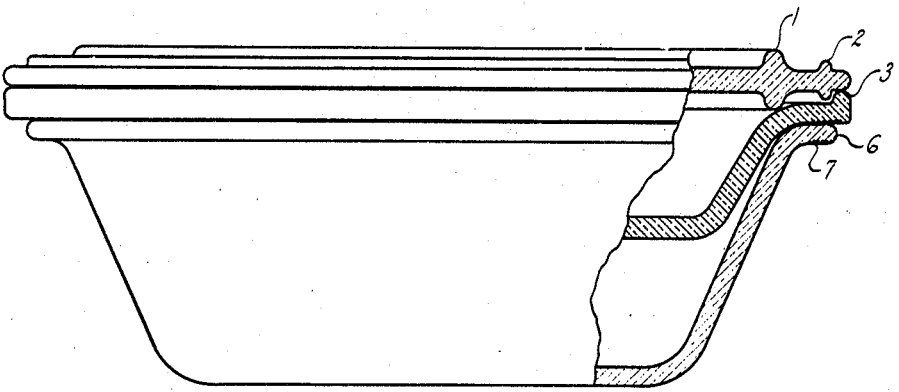
Figure 5:
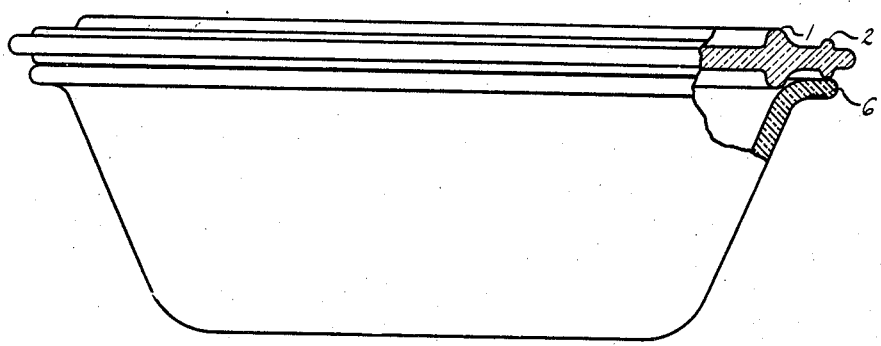
Figure 6:
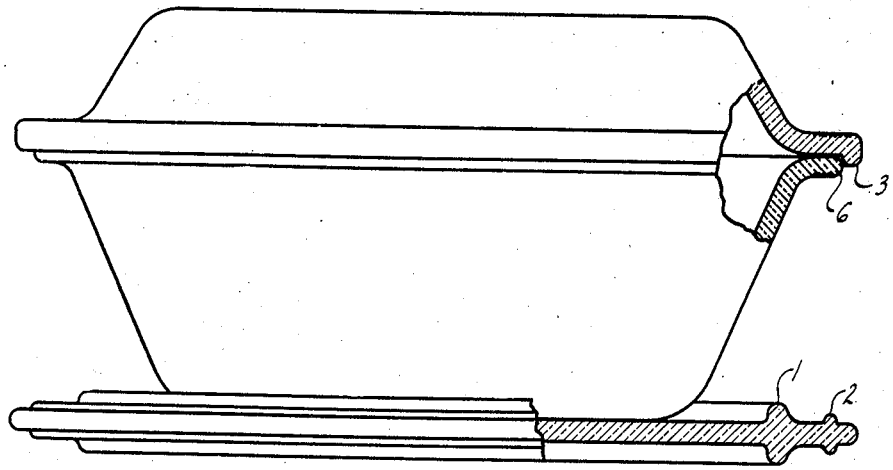
Figure 7:
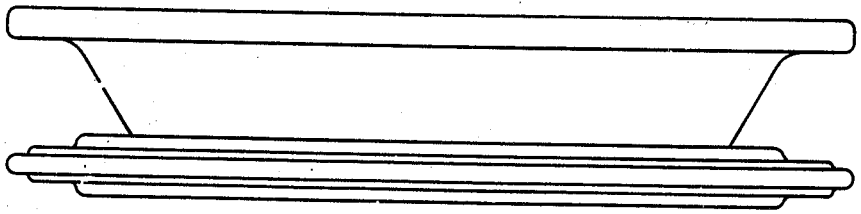

The invention will become more apparent from a consideration of the accompanying drawings in which like reference characters designate like parts, and in which:

Fig. 1 is a view partially in side elevation and partially in cross-section of a cover or base for cooking and food storage utensils;

Fig. 2 a similar view of a shallow casserole or pie-plate;

Fig. 3 a similar view of a deep dish or casserole;

Fig. 4 a front elevational view partially in section of the assembly of the dishes and covers of Figs. 1 to 3;

Fig. 5 a front elevational view partially in section of the dish of Fig. 3 and the cover of Fig. 1;

Fig. 6 a front elevational view partially in cross-section of the assembly of the dishes of Figs. 2 and 3 supported upon the cover member of Fig. 1; and Fig. 7 a front elevational view of the dish of Fig. 2 supported on the cover plate of Fig. 1.

The views of Figs. 1 to 7 illustrate the various combinations that may be obtained from the use of the cover and dishes.

With reference to Fig. 1 of the drawings, the cover or base is provided with a plurality of upstanding peripheral flanges 1 and 2, the dish or pie-plate of Fig. 2 is provided with a vertical peripheral flange or bead 3 and the underside of the horizontal flange or lip 4 is provided with fine annular grooves or serrations 5 which facilitate handling of the plate without slippage.

The deep dish of Fig. 3 is provided with a straight peripheral flange 6 having its under-surface grooved, as indicated at 7.

The structural features of the dishes are designed to permit of the assemblies, as shown beginning Figs. 4 to 7 of the drawings.

In Fig. 4 the outer flange 2 is shown to interact with the bead 3 of the shallow dish to prevent lateral displacement of the cover from the dish and the body contours of the shallow and deep vessels, and the curvature of the under-side of the flange 4 is such relative to the curvature of the upper-side of the flange 6 that they will nest firmly when arranged in superposed relation, as shown in Fig. 4.

In Fig. 5 the cover is mounted on the deep dish with the bead 1 abutting the upper curved face of the flange 6 and the bead 2 seating at the periphery of flange 6. In Fig. 6 the deep dish is placed on the cover member and the shallow dish is inverted with the bead 3 abutting the outer periphery of the flange 6 to prevent lateral displacement.

In the assembly of the deep and shallow bowl of Fig. 6, it is useful as a casserole, the flanges providing a relatively large seating area, and the inverted bead 3 overlaps the edge of the radial flange 6.

In the form of Fig. 4, the assembly constitutes a cold storage food container in which food can be stored separately in the deep and shallow bowls and the cover placed thereon, as shown.

In the remaining figures of the drawings, the dish and cover combinations are illustrated, the cover member being used as a heat pad in Figs. 6 and 7 if it has not been employed as a cover during the cooking of the food.

Although one embodiment of the invention has been herein illustrated and described, it will be evident to those skilled in the art that various modifications may be made in the details of construction without departing from the principles herein set forth.

I claim:

A glass dish and cover therefor, said dish having a flat radial flange at the upper periphery of substantial width and an annular bead at the outer periphery of said flange, and said cover having annular beads for engaging the wall and flange of said dish, one of said beads interacting with the bead of said dish flange.

LOUIS POGLEIN.